US011141856B2

(12) United States Patent
Roy Chaudhuri et al.

(10) Patent No.: US 11,141,856 B2
(45) Date of Patent: Oct. 12, 2021

(54) SYSTEMS AND METHODS FOR GENERATING CONTROL SYSTEM SOLUTIONS FOR ROBOTICS ENVIRONMENTS

(71) Applicant: Tata Consultancy Services Limited, Mumbai (IN)

(72) Inventors: Subhrojyoti Roy Chaudhuri, Pune (IN); Amar Satyabroto Banerjee, Pune (IN); Puneet Patwari, Pune (IN); Arijit Mukherjee, Kolkata (IN); Ajay Kattepur, Bangalore (IN); Balamuralidhar Purushothaman, Bangalore (IN); Arpan Pal, Kolkata (IN); Sounak Dey, Kolkata (IN); Chayan Sarkar, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 248 days.

(21) Appl. No.: 16/268,952

(22) Filed: Feb. 6, 2019

(65) Prior Publication Data
US 2019/0389060 A1   Dec. 26, 2019

(30) Foreign Application Priority Data
Jun. 25, 2018   (IN) .............................. 201821023578

(51) Int. Cl.
*B25J 9/16*   (2006.01)

(52) U.S. Cl.
CPC ........... *B25J 9/1605* (2013.01); *B25J 9/1661* (2013.01); *B25J 9/1671* (2013.01)

(58) Field of Classification Search
CPC ....... B25J 9/1605; B25J 9/1661; B25J 9/1671
See application file for complete search history.

(56) References Cited

U.S. PATENT DOCUMENTS

| 10,800,040 B1* | 10/2020 | Beckman | ............... B25J 9/1605 |
| 2007/0233280 A1* | 10/2007 | Bacon | ................... B25J 9/1605 700/1 |

(Continued)

FOREIGN PATENT DOCUMENTS

| DE | 10 2011 082 800 | 3/2013 |
| KR | 10-2010-0094009 | 8/2010 |

OTHER PUBLICATIONS

Stenmark, M. et al. "Natural Language Programming of Industrial Robots," 44th *International Symposium on Robotics (ISR)*, 2013, Oct. 24-26, 2013, Seoul, Korea; 6 pages.

(Continued)

*Primary Examiner* — Jeff A Burke
*Assistant Examiner* — Mohamad O El Sayah
(74) *Attorney, Agent, or Firm* — Finnegan, Henderson, Farabow, Garrett & Dunner, LLP

(57) ABSTRACT

Systems and methods for generating control system solutions for robotics environments is provided. The traditional systems and methods provide robotics solutions but specialized to only a particular robotic application, domain, and selected structure. The embodiments of the proposed disclosure provide for generating one or more control system solutions for a plurality of robotics environment by acquiring a robotics domain knowledge corresponding to the plurality of robotics environments; extracting one or more solution specifications based upon the robotics domain knowledge; translating the one or more solution specifications into one or more design solutions; generating, the one or more control system solutions for the plurality of robotics environments; and optimizing the one or more control system solutions generated by performing, based upon a set of task execution logs executed, a close loop verification to validate a plurality of commands and a plurality of state (Continued)

transitions executing in the plurality of robotics environments.

15 Claims, 9 Drawing Sheets

(56) References Cited

U.S. PATENT DOCUMENTS

| | | | | |
|---|---|---|---|---|
| 2009/0187278 A1* | 7/2009 | Zhuk | ................... | G05D 1/0291 |
| | | | | 700/246 |
| 2015/0331416 A1* | 11/2015 | Feniello | ................. | B25J 9/1656 |
| | | | | 700/250 |
| 2018/0364711 A1* | 12/2018 | Goldfain | ................ | G07C 5/085 |

OTHER PUBLICATIONS

Francesca, G. et al. (Jan. 2014). "A Novel Approach to the Automatic Design of Control Software for Robot Swarms," *IRIDIA—Technical Report Series*; 26 pages.

* cited by examiner

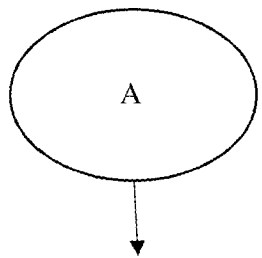

Performing, based upon the one or more design solutions, a plurality of steps, wherein the plurality of steps comprise: (i) generating, by a solution synthesizer component, one or more control system solutions for the plurality of robotics environments, wherein the one or more control system solutions comprise an architectural design and a plurality of components for implementing the architectural design in the plurality of robotics environments; and (ii) generating, by the solution synthesizer component, one or more simulation models for executing a set of simulation activities in the simulating environment. — 404

FIG. 4B

SYSTEMS AND METHODS FOR GENERATING CONTROL SYSTEM SOLUTIONS FOR ROBOTICS ENVIRONMENTS

PRIORITY CLAIM

This U.S. patent application claims priority under 35 U.S.C. § 119 to: India Application No. 201821023578, filed on Jun. 25, 2018. The entire contents of the aforementioned application are incorporated herein by reference.

TECHNICAL FIELD

The disclosure herein generally relates to generating control system solutions for robotics environments, and, more particularly, to systems and methods for generating control system solutions for robotics environments.

BACKGROUND

Robots and related technologies are being used widely in digital and automation era in a variety of applications and industries. Robots are often used, for example, to perform repetitive manufacturing procedures. Robots have the ability, for example, to precisely, quickly, and repeatedly place, pick, solder, and tighten components. This can enable robots to improve product quality while reducing build time and cost. As a result, robots are well-adapted to perform repetitive procedures that human beings may find less than rewarding. There are many applications, domains, and resulting structures for robots. Examples range from and include unmanned autonomous robotic vehicles in a military domain, surveillance and security robots in a commercial domain, robotic manipulator arms in an industrial domain, medicinal transport robots in a professional service domain, vacuum cleaning robots in a home, legged entertainment robots for personal use, among many others. The mechanisms, electronics, sensors, actuators, and their interconnections all also vary across robots. Furthermore, architecture(s) or solution(s) that control the behavior of a robot also varies across robotics applications.

A fundamental problem of current robotics and in general robotic applications is related to multiple translations from a natural language of task requirements to compiled and integrated working systems. It takes tremendous resources and multiple teams to define a task, translate requirements into logics of primitive algorithms and integrating them together with generic and specific services of software applications.

Traditional systems and methods providing robotics solutions have been specialized to a particular robotic application, domain, and selected structure. As a result, robotics architectures are inherently monolithic, lack inter-operability, lack use of mainstream open standards, and end up being costly. For example, if a new robotics application for a particular environment and domain is to be developed, a combination of underlying mechanisms, electronics, sensors, and actuators are selected and configured and the entire software for interacting with such hardware as well as the software for embodying the desired application behavior is either developed from scratch and/or reused from an existing specialized robotics application, domain, and/or structure to the new robotics application, domain, and/or structure. Similarly, if a new sensor, or new behavior etc. is added to an existing robotics application, a laborious process of integrating new robotics application(s) into a monolithic architecture ensues.

SUMMARY

Embodiments of the present disclosure present technological improvements as solutions to one or more of the above-mentioned technical problems recognized by the inventors in conventional systems. For example, in one embodiment, a method for generating control system solutions for robotics environments is provided, the method comprising: acquiring, via one or more hardware processors, a first set of information from a plurality of sources, wherein the first set of information comprises robotics domain knowledge corresponding to a plurality of robotics environments, and wherein the plurality of robotics environments comprise a real-time environment and a simulating environment; extracting, based upon the first set of information, a second set of information via a solution description component, wherein the second set of information comprises one or more solution specifications corresponding to the plurality of robotics environments; translating, via a solution synthesizer component, the second set of information into one or more design solutions for the plurality of robotics environments; and performing, based upon the one or more design solutions, a plurality of steps, wherein the plurality of steps comprise: (i) generating, via the solution synthesizer component, one or more control system solutions for the plurality of robotics environments, wherein the one or more control system solutions comprise an architectural design and a plurality of components for implementing the architectural design in the plurality of robotics environments; and (ii) generating, via the solution synthesizer component, one or more simulation models for executing a set of simulation activities in the simulating environment; translating the second set of information by generating, based upon the first set of information, a synthesized design for the one or more control system solutions by the solution synthesizer component; generating the one or more control system solutions by: (i) generating, using a Domain Specific Language (DSL), a set of implementation codes corresponding to a plurality of Robots Operating Systems (ROS), wherein each of the plurality of ROS correspond to at least one of the plurality of robotics environments; (ii) generating, using the DSL, one or more configuration files corresponding to a plurality of robotic simulators, wherein each of the plurality of robotic simulators correspond to at least one of the plurality of robotics environments; and (iii) generating one or more design specifications corresponding to the generated synthesized design to verify the one or more control system solutions generated; optimizing, based upon the one or more simulation models, the generated one or more control system solutions to extract a behavior model by the solution synthesizer component, and wherein the behavior model comprises a plurality of commands and a plurality of state transitions executing in the plurality of robotics environments; and performing, a close loop verification by executing, based upon the behavior model, a set of task execution logs to validate the plurality of commands and the plurality of state transitions executing in the plurality of robotics environments.

In another aspect, there is provided a system for generating control system solutions for robotics environments, the system comprising a memory storing instructions; one or more communication interfaces; and one or more hardware processors coupled to the memory via the one or more communication interfaces, wherein the one or more hardware processors are configured by the instructions to: acquire, a first set of information from a plurality of sources, wherein the first set of information comprises robotics domain knowledge corresponding to a plurality of robotics environments, and wherein the plurality of robotics environments comprise a real-time environment and a simulating environment; extract, based upon the first set of information, a second set of information via a solution description component, wherein the second set of information comprises one or more solution specifications corresponding to the plurality of robotics environments; translate, via a solution synthesizer component, the second set of information into one or more design solutions for the plurality of robotics environments; and perform, based upon the one or more design solutions, a plurality of steps, wherein the plurality of steps comprise: (i) generate, via the solution synthesizer component, one or more control system solutions for the plurality of robotics environments, wherein the one or more control system solutions comprise an architectural design and a plurality of components for implementing the architectural design in the plurality of robotics environments; and (ii) generate, via the solution synthesizer component, one or more simulation models for executing a set of simulation activities in the simulating environment; translate the second set of information by generating, based upon the first set of information, a synthesized design for the one or more control system solutions via the solution synthesizer component; generate the one or more control system solutions by: (i) generating, using a Domain Specific Language (DSL), a set of implementation codes corresponding to a plurality of Robots Operating Systems (ROS), wherein each of the plurality of ROS correspond to at least one of the plurality of robotics environments; (ii) generating, using the DSL, one or more configuration files corresponding to a plurality of robotic simulators, wherein each of the plurality of robotic simulators correspond to at least one of the plurality of robotics environments; and (iii) generating one or more design specifications corresponding to the generated synthesized design to verify the one or more control system solutions generated; optimize, based upon the one or more simulation models, the generated one or more control system solutions to extract a behavior model via the solution synthesizer component, and wherein the behavior model comprises a plurality of commands and a plurality of state transitions executing in the plurality of robotics environments; and perform, a close loop verification by executing, based upon the behavior model, a set of task execution logs to validate the plurality of commands and the plurality of state transitions executing in the plurality of robotics environments.

In yet another aspect, there is provided one or more non-transitory machine readable information storage mediums comprising one or more instructions which when executed by one or more hardware processors causes the one or more hardware processors to perform a method for generating control system solutions for robotics environments, the method comprising: acquiring, a first set of information from a plurality of sources, wherein the first set of information comprises robotics domain knowledge corresponding to a plurality of robotics environments, and wherein the plurality of robotics environments comprise a real-time environment and a simulating environment; extracting, based upon the first set of information, a second set of information via a solution description component, wherein the second set of information comprises one or more solution specifications corresponding to the plurality of robotics environments; translating, via a solution synthesizer component, the second set of information into one or more design solutions for the plurality of robotics environments; and performing, based upon the one or more design solutions, a plurality of steps, wherein the plurality of steps comprise: (i) generating, via the solution synthesizer component, one or more control system solutions for the plurality of robotics environments, wherein the one or more control system solutions comprise an architectural design and a plurality of components for implementing the architectural design in the plurality of robotics environments; and (ii) generating, via the solution synthesizer component, one or more simulation models for executing a set of simulation activities in the simulating environment; translating the second set of information by generating, based upon the first set of information, a synthesized design for the one or more control system solutions by the solution synthesizer component; generating the one or more control system solutions by: (i) generating, using a Domain Specific Language (DSL), a set of implementation codes corresponding to a plurality of Robots Operating Systems (ROS), wherein each of the plurality of ROS correspond to at least one of the plurality of robotics environments; (ii) generating, using the DSL, one or more configuration files corresponding to a plurality of robotic simulators, wherein each of the plurality of robotic simulators correspond to at least one of the plurality of robotics environments; and (iii) generating one or more design specifications corresponding to the generated synthesized design to verify the one or more control system solutions generated; and optimizing, based upon the one or more simulation models, the generated one or more control system solutions to extract a behavior model by the solution synthesizer component, and wherein the behavior model comprises a plurality of commands and a plurality of state transitions executing in the plurality of robotics environments; and performing, a close loop verification by executing, based upon the behavior model, a set of task execution logs to validate the plurality of commands and the plurality of state transitions executing in the plurality of robotics environments.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4A through 4B is a flow diagram illustrating the steps involved in the process of generating the control system solutions for the robotics environments, in accordance with some embodiments of the present disclosure.

DETAILED DESCRIPTION

Figure 1:
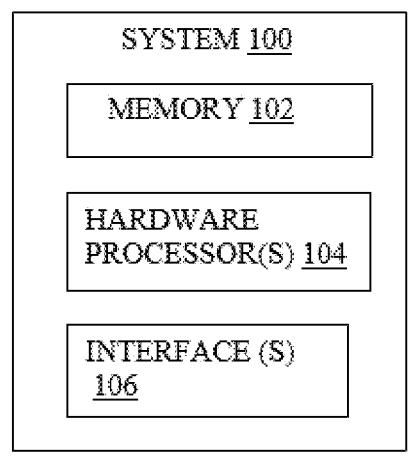
FIG. 1 illustrates a block diagram of a system for generating control system solutions for robotics environments, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods for generating control system solutions for robotics environments. There are diversity of potential areas in which robotics applications are being developed and implemented. Key areas comprise manufacturing industry, healthcare, and military applications etc. Robots also play a crucial role in carrying out tasks in environments which are too hazardous for humans to enter. While there has been significant effort devoted to designing robots, there are limitations associated with the development of robots. Current limitations associated with designing robots comprise complex nature of skills that are involved in designing and developing robots, and a lack of portability with current robotic designs for extension to the design of new robots, and an inability of robotic devices to respond to unforeseen situations or circumstances.

Generally, operation control of a robot to determine and carry out a behavior plan is performed by executing a program code (such as an application) on a computation system. A robot control software architecture used in the traditional systems and methods pertaining to robotics cannot be used as a general autonomous robot control architecture in a broad sense since it is limited to a specific application, i.e., a pet-type robot. The traditional systems and methods providing robotics solutions have been specialized to a particular robotic application, domain, and selected structure. As a result, present robotics architectures are inherently monolithic, lack inter-operability, lack use of mainstream open standards, and end up being costly.

In addition to above, the traditional systems and methods suffer from multiple other drawbacks. For example, none of the traditional systems and methods provide for an integration of robotics as well as application (warehouse) domain specific vocabulary in an integrated engineering language for robotics. Further, none of the traditional systems and methods provide for optimizing and performance tuning of various aspects of robotics control solutions.

Hence, there is a need for a technology that provides for generating a high level description of the processes and tasks that the robotic control solutions must implement, generating a set of workflow definitions to carry out specific tasks based upon one or more task descriptions, auto generation of solution design and synthesis, and generating an entire robotic control solution as well as the configuration of the environment the solution needs to execute in, completely automatically, based upon robotics domain knowledge obtained from multiple sources.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

FIG. 1 illustrates an exemplary block diagram of a system 100 for generating control system solutions for robotics environments, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
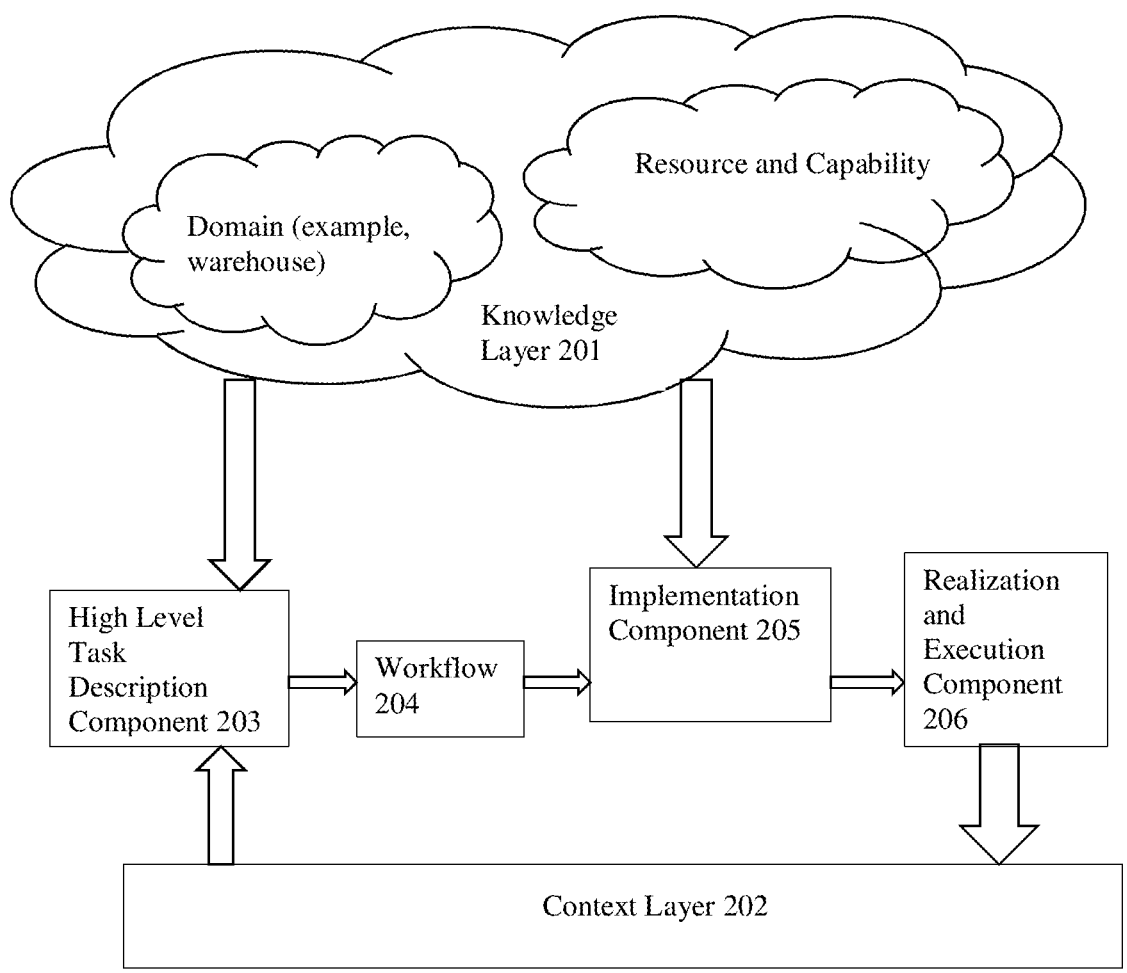
FIG. 2 illustrates a middleware architecture or a solution architecture to which the control system solutions generated for the robotics environments confirms to, in accordance with some embodiments of the present disclosure.

According to an embodiment of the present disclosure, referring to FIG. 2, a middleware architecture or a solution architecture to which the proposed methodology confirms to, may be considered. Referring to FIG. 2 again, it may be noted that the proposed disclosure provides for a generic middleware architecture which may be used create robotic solutions for a plurality of robotic domains comprising a plurality of problems for which one or more robotic solutions may be desired. The middleware architecture may thus serve as a standard architecture for a plurality of robotic solutions to be created.

Referring to FIG. 2 yet again, it may be noted that the middleware architecture or the solution architecture comprises a knowledge layer 201, wherein the knowledge layer 201 comprises knowledge corresponding to a plurality of robotic or related domains (e.g. warehouse, search and rescue) and the corresponding solution domains. Referring to FIG. 2 yet again, it may be noted that the middleware architecture comprises a context layer 202, on which the one or more robotic solutions execute (post generation of robotic solutions). The context layer 202 maintains all information about the context that is necessary for the middleware architecture to operate. A high level description component 203 comprises a high level description of processes and tasks that the one or more robotic solutions implement. For example a task maybe about automating picking and placing of artefacts in a warehouse by one or more warehouse robots.

Referring to FIG. 2 yet again, a workflow 204 comprises a set of workflow definitions to carry out one or more specific tasks based upon one or more robotic task descriptions. Hence, the workflow 204 contains details about a specific set of instructions that a robot must perform to carry out the one or more specific tasks, for example, instructions to pick a specific object from a specific rack in a warehouse. An implementation component 205 provides one or more Application Programming Interfaces (APIs) to interface and execute one or more workflows. The implementation component 205 further comprises one or more interfaces with an underlying robotics hardware such that the instructions may be executed for performing one or more physical tasks. Finally, a realization and execution component 206 for verifying the one or more workflows before actual execution.

Figure 3:
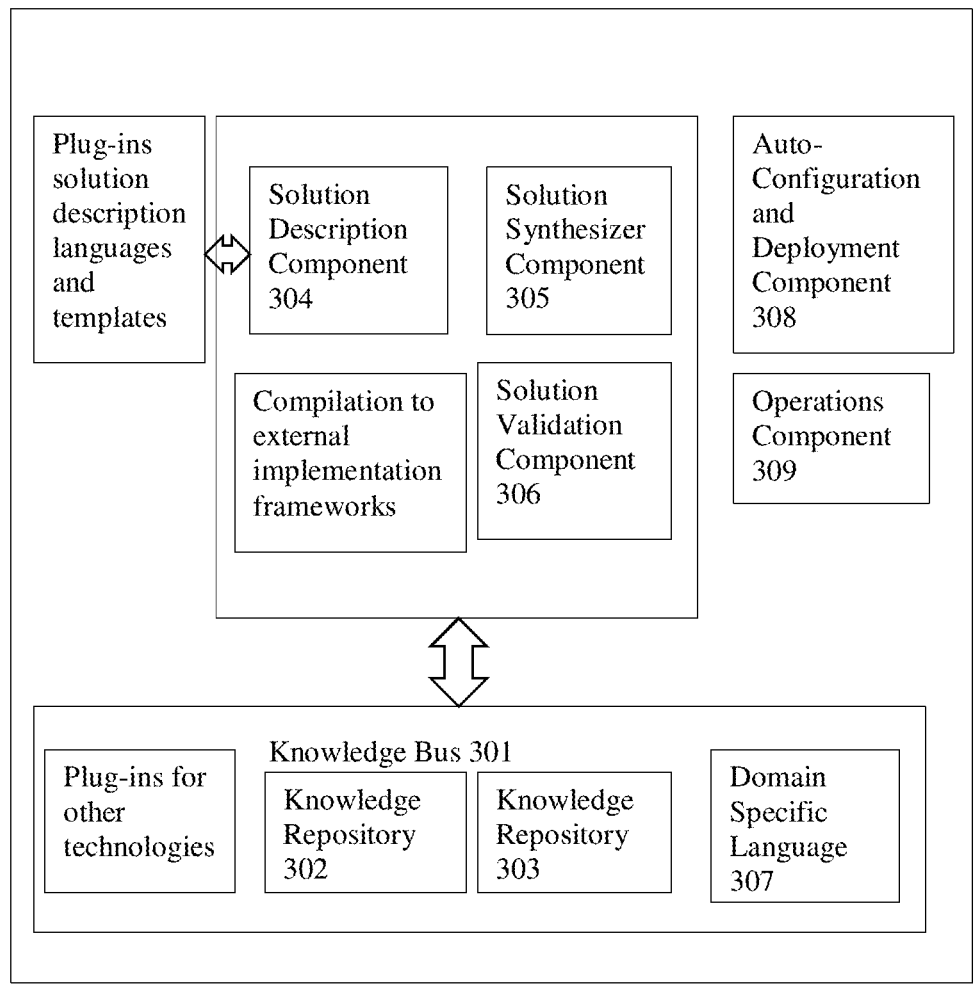
FIG. 3 is an architectural diagram depicting components and flow of the system for generating the control system solutions for the robotics environments, in accordance with some embodiments of the present disclosure.

According to an embodiment of the present disclosure, referring to FIG. 3, the technical architecture of the proposed disclosure comprising technical components may be considered in detail. Referring to FIG. 3 again, a knowledge bus 301 facilitates acquiring knowledge corresponding to a plurality of robotics domains. The knowledge bus 301 comprises two knowledge repositories, that is, a knowledge repository 302 and a knowledge repository 303. The knowledge repository 302 comprises information on resources and capabilities corresponding to the plurality of robotics domains. The knowledge repository 303 comprises information corresponding to a plurality of contextual problems.

A Solution Description Component 304 facilitates extracting solution specifications for robotics environments. A Solution Synthesizer Component 305 translates the extracted solution specifications into a corresponding synthesized design or a solution. A Solution Validation Component 306 validates generated solution(s) in a simulating environment. A Domain Specific Language (DSL) 307 facilitates description of the generated solution(s) in one or more programming languages. An auto-configuration and deployment component 308 deploys auto-generated implementation (or the generated solution(s)) in the deployment environment. An operations component 309 ensures that an operational system behaves as expected and as specified in the initial design.

Figure 4A:
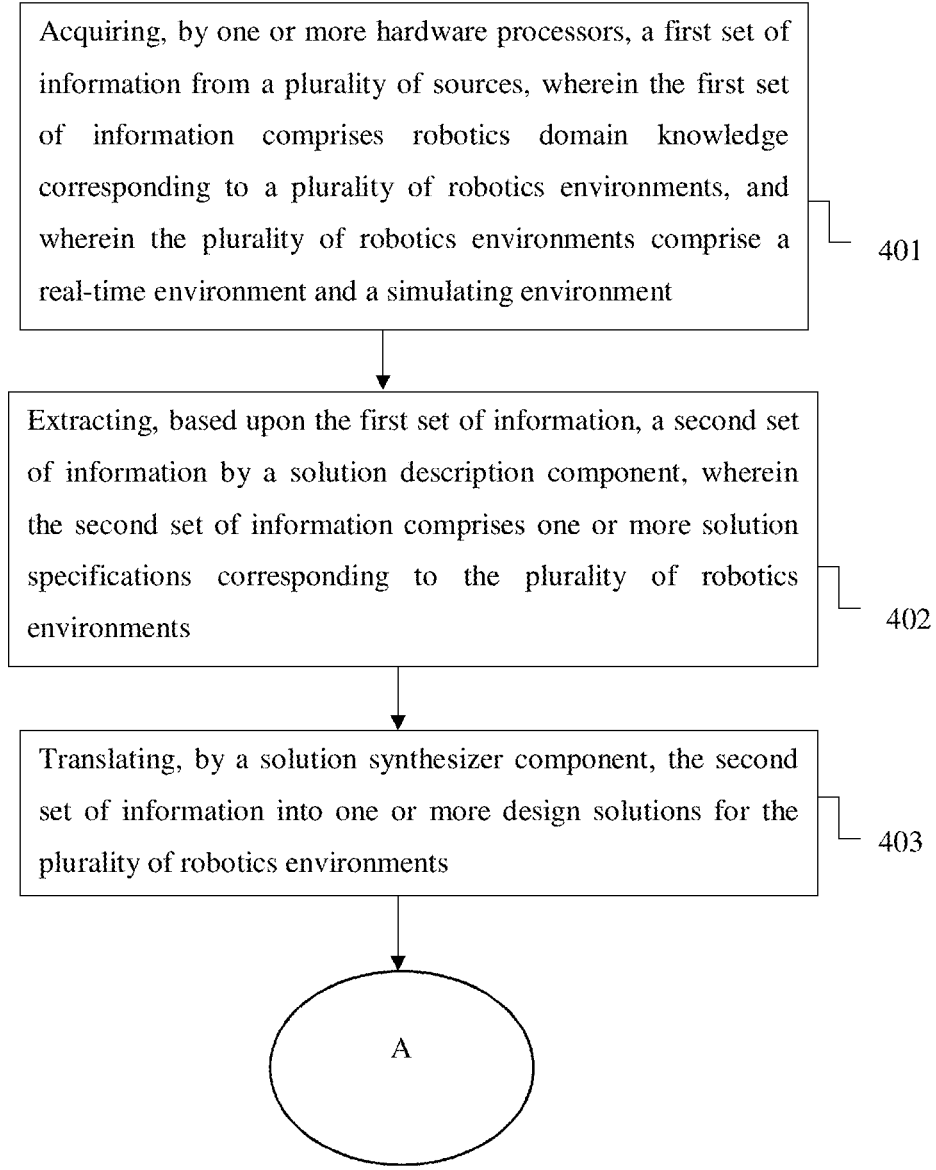

FIG. 4A through 4B, with reference to FIG. 1, illustrates an exemplary flow diagram of a method for generating the control system solutions for the robotics environments, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 401, the one or more hardware processors 104 acquire a first set of information from a plurality of sources, wherein the first set of information comprises robotics domain knowledge corresponding to a plurality of robotics environments, and wherein the plurality of robotics environments comprise a real-time environment and a simulating environment.

Robots and related technologies are being applied across a plurality of applications and domains. The plurality of robotics environments may comprise, inter-alia, robots in a warehouse performing a sequence of tasks, unmanned autonomous robotic vehicles in a military domain, surveillance and security robots in a commercial domain, robotic manipulator arms in an industrial domain, medicinal transport robots in a professional service domain, vacuum cleaning robots in a home, legged entertainment robots for personal use, among many others.

Further, the plurality of robotics environments may be real-time and/or simulating. As is known in the art, the real world surroundings of a physical robot is a "physical" or the 'real-time environment' and a computerized simulation of a physical environment comprises a 'virtual environment' or the 'simulating environment'. When loaded a computing device, a software provides one or more visual images of one or more virtual robots and the virtual environment that simulate the physical robot and the physical environment. In addition, the software provides for interactions between the one or more virtual robots and the virtual environment that simulate interactions between the physical robot and the physical environment.

In an embodiment, the first set of information comprises knowledge from the plurality of robotics domains, information on resources and capabilities corresponding to the plurality of robotics domains, a high level description of a plurality of processes and tasks that one or more robotic solutions must implement (for example, a task for automating the picking and placing of artefacts in a warehouse by one or more robots), a set of workflow definitions to carry out a plurality of tasks based upon the task, a set of instructions that the one or more robots must perform to carry out the plurality of tasks.

In an embodiment, the one or more hardware processors 104 may acquire the first set of information via the knowledge bus 301. The knowledge bus 301 facilitates acquiring knowledge corresponding to the plurality of robotics domains. In one embodiment, the knowledge bus 301 may comprise of a knowledge repository 302, wherein the knowledge repository 302 may comprise knowledge or the information on the resources and capabilities corresponding to the plurality of robotics domains, which may be used for implementing a robotics software. In another embodiment, the knowledge bus 301 may comprise of another repository 303, comprising knowledge or information on the plurality of contextual problems, for example, specific warehouses etc.

In an embodiment, the one or more hardware processors 104 acquire the first set of information from the plurality of sources. For example, in addition to acquiring the first set of information from the knowledge repositories 302 and 303, the one or more hardware processors 104 may acquire the first set of information (by implementing the knowledge bus 301) from one or more existing databases, or may further acquire a set of information on robotics domain captured by existing robots via reasoning or observing of human activities.

Figure 5:
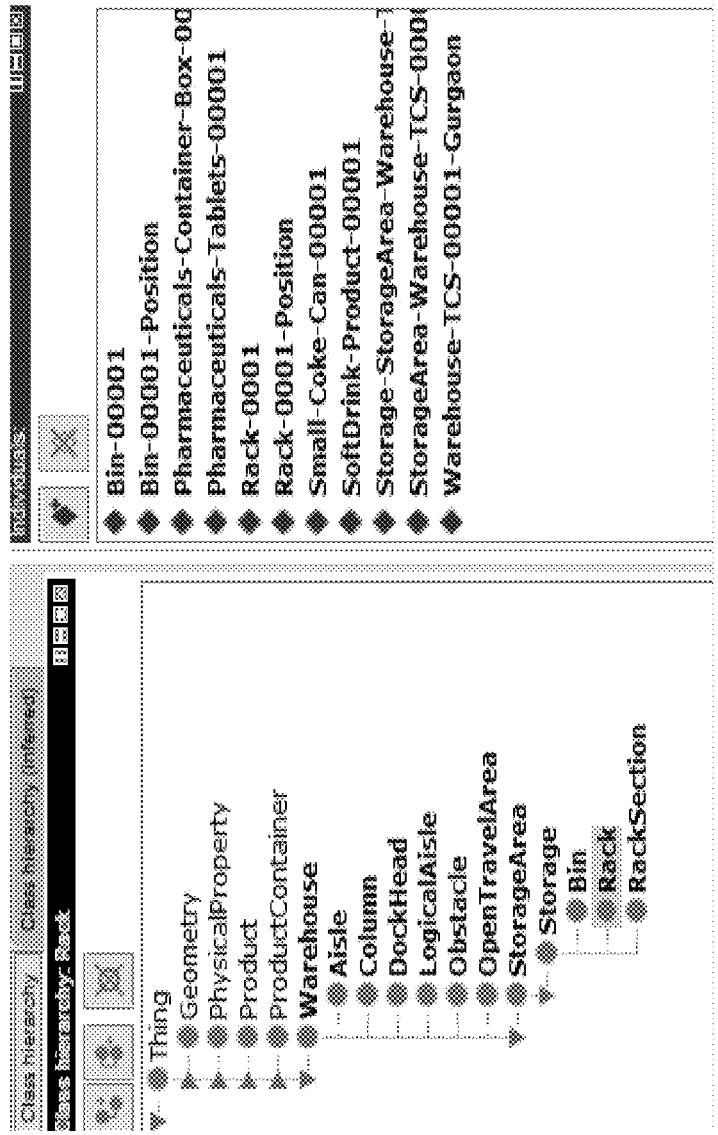
FIG. 5 through 6 illustrates an example of a robotics domain knowledge acquired from a plurality of sources, and populated in a knowledge bus, in accordance with some embodiments of the present disclosure.
Figure 6:
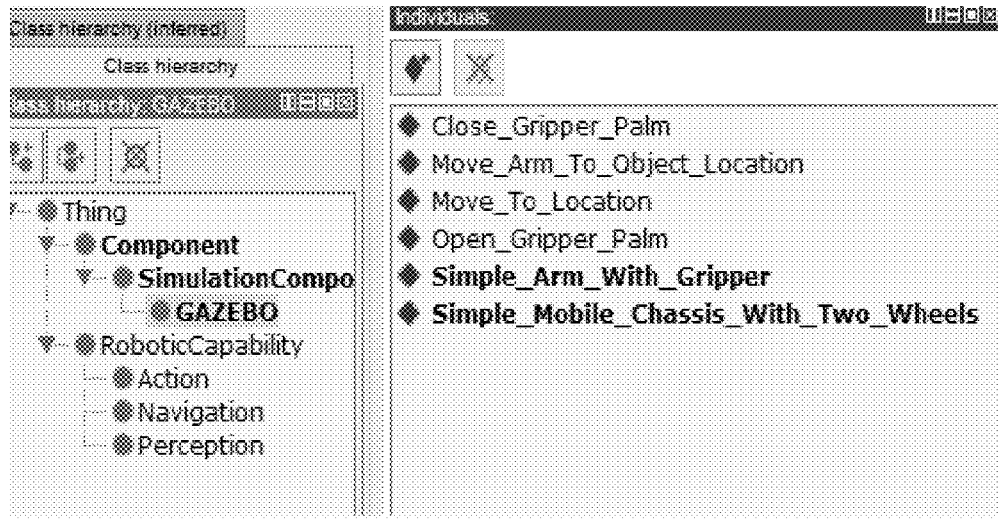

In an example implementation of step 401, referring to FIG. 5 through 6, the first set of information or the robotics domain knowledge acquired for a warehouse procurement from the plurality of sources and populated in the knowledge bus 301 may be referred. Referring to FIG. 5 through 6 again, it may be noted that the robotics domain knowledge is further associated corresponding behavior knowledge. In an example implementation, the behavior knowledge may be captured using the DSL 307 as below:

```
InterfaceDescription Gripper_ID {
commands {
OPEN_GRIPPER_PALM[std msqs.String mode = open],
MOVE_ARM_TO_OBJECT_LOCATION(asynch true)
[ Object Location object_location],
    CLOSE_GRIPPER_PALM[std mscps.Strinq mode = open]
    operatingStates {
    START [ ],
    END [ ]
    }
    responses {
    RESPONSE[std msqs.Strinq msg]
    }
}
controlNode Gripper_CN{
Associated Interface Description : Gripper ID
commandResponseBlock {
Command gripper.Gripper_ID.OPEN_GRIPPER_PALM {
Transitions {
currentstate gripper.Gripper_ID.START {
exitAction Action {
Op open_gripper_palm_request_script inputItems {
Gripper_ID.OPEN_GRIPPER_PALM.mode )
execute
"platform:/resource/Gripper_Warehouse/operation_scripts/
manipulate_palm_request_script.py"
) => nextState gripper.Gripper_ID.END (
entryAction Action [
Op open_gripper_palm_response_script
//execute "platform:/resource/Gripper_Warehouse/operation scripts/
manipulate palm response script.py"
}
) => nextState gripper.GRIPPER_ID.END (
entryAction Action [
Op open_gripper_palm_response_script
//execute "platform:/resource/Gripper_Warehouse/operation scripts/
manipulate palm response script.py"
]
)
}
ResponseBlock {
```

According to an embodiment of the present disclosure, at step 402, the one or more hardware processors 104 extract, based upon the first set of information, a second set of information via the solution description component 304, wherein the second set of information comprises one or more solution specifications corresponding to the plurality of robotics environments. In an embodiment, the one or more solution specifications comprise description of one or more solutions in the one or more programming languages, for example, the DSL 307, wherein the one or more solutions are implemented and executed by the robotics software for the plurality of robotics environments.

In an embodiment, the one or more programming languages (for example, the DSL 307) integrate in corresponding vocabularies of the one or more programming languages, a plurality of concepts and relationships corresponding to the first set of information acquired from the knowledge bus 301. In an example implementation of the step 402, the second set of information extracted by the solution description component 304 may be as below:

Resource: Mobile Robot

Description: The "Mobile Robot" consists of two components. The "Mobile Robot" has one "Simple_Mobile_Chassis_With_Two_Wheels. The –Mobile Robot" has a –Simple_Arm_With_Gripper".

Abstract Solution Move Pick Drop:
The Mobile Robot" should be able to "Move To Location" of Rack*
The Mobile Robot" should be able to pick the SmallCan".
To pick Mobile Robot" should do the following:—
The "Mobile Robot" should be able to "Open Gripper Palm on "Bin".
The "Mobile Robot" should be able to "MoveArm" to the location of SmallCan.
The "Mobile Robot" should be able to Close Gripper Palm and hold the SmallCan". end
The "Mobile Robot" should be able to "Move To Location" of "Bin".
The "Mobile Robot" shall drop the "SmallCan in the 'Bin'.
To drop "Mobile Robot" should do the following:—
The "Mobile Robot" should be able to "Move Arm" to the target location in the "Bin".
The "Mobile Robot" should be able to "Open Gripper Palm" and drop the "SmallCan". end –SmallCan"=–Small_Coke_Can_00001–,
"Bin"="Bin_00001","Rack"="Rack_0001"    Solution 1:

According to an embodiment of the present disclosure, at step 403, the one or more hardware processors 104 translate, via the solution synthesizer component 305, the second set of information into one or more design solutions for the plurality of robotics environments. The solution synthesizer component 305 translates the one or more solution specifications using a solution description language (for example, a Monitoring and Control Specification Modeling Language) into the one or more design solutions, wherein the one or more design solutions correspond to a robotic application comprising a robotic software, and wherein the one or more design solutions represent one or more concrete designs for the robotic application or the robotic software.

In an embodiment, the step of translating the second set of information comprises generating a synthesized design for a final output (that is, the control system solutions) to be generated by implementing the solution synthesizer component 305, wherein the synthesized design is generated using the Monitoring and Control Specification Modeling Language. In an embodiment, the synthesized design represents a synthesized solution for a set of multi-robots activities and tasks to be executed in each of the plurality of robotics environments.

In an example implementation of the step 403, the synthesized design or the one or more design solutions may be referred. Referring to the below example, it may be noted that the synthesized design represents the synthesized solution for the set of multi-robots activities and tasks to be executed, for example, "OPEN_GRIPPER_PALM", and if "OPEN_GRIPPER_PALM" succeeds, next activity to be executed is "MOVE"ARM_TO_OBJECTS" and so on.

One or More Design Solutions

```
ActivityDiagram PICK_TASK produces outcomes
(succeeded,aborted,preempted) has activities {
Activity OPEN GRIPPER PALM{
    requireCapability {
gripper.Gripper ID.OPEN GRIPPER PALM
}
conditions {
if ( outcome is succeeded ) nextActivity : MOVE ARM TO OBJECT,
if (outcome is preempted) final outcome : PICK TASK.preempted,
if (outcome is aborted) final outcome : PICK TASK.aborted
}
},
Activity MOVE_ARM_TO_OBJECT{
inputData : {
Object Location
}
requireCapability
gripper.Gripper_ID.MOVE_ARM TO OBJECT LOCATION
)
conditions {
if ( outcome is succeeded ) nextActivity : CLOSE GRIPPER PALM,
if(outcome is preempted) final outcome : PICK_TASK.preempted,
if(outcome is aborted) final outcome : PICK TASK.aborted
}
},
Activity CLOSE GRIPPER_PALM{
requireCapability {
gripper.Gripper_ID.CLOSE_GRIPPER_PALM
}
conditions {
```

Synthesized Design Generated—

```
ActivityDiagram MOVE_TASK produces outcomes {
succeded, aborted
}
has activities
{
Activity GO_TO_DESTINATION{
inputData : {
Pick Location
}
requireCapability {
mobile_base.Navigation_ID.MOVE_TO_LOCATION
}
conditions {
if ( outcome is reached_destination ) final outcome : succeeded
}
}
}
```

In an embodiment, the one or more design solutions or the synthesized design generated by the solution synthesizer component 305 may be verified using one or more formal methods of verification, for example, via a Petri Net Model. In an example implementation, the synthesized design comprising the set of multi-robots activities and tasks to be executed may be translated into the Petri Net model by the one or more hardware processors 104, and based upon the synthesized design translated, the set of multi-robots activities and tasks to be executed may be verified.

Figure 7:
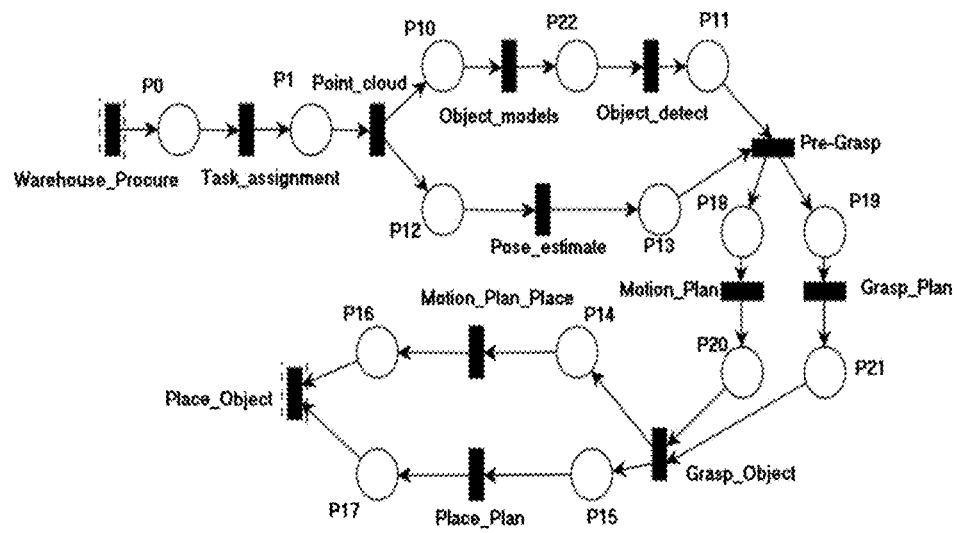
FIG. 7 illustrates an example of a synthesized design translated into a Petri Net Model, in accordance with some embodiments of the present disclosure.

In an example implementation, referring to FIG. 7, an example of the synthesized design translated into the Petri Net model may be referred. Referring to FIG. 7 again, it may be noted that the translated synthesized design comprises the set of multi-robots activities and tasks to be executed for a warehouse procurement, for example, object detection (object_detect), grasp plan (Grasp_Plan), and so on.

In an embodiment, considering examples of steps 401 and 402 along with the behavior knowledge example again, it may be noted that as compared to the traditional systems and methods, the proposed disclosure provides for an integration of robotics as well as application (warehouse) domain specific vocabulary in an integrated engineering language for the plurality of robotics environments.

According to an embodiment of the present disclosure, at step 404, the one or more hardware processors 104 perform, based upon the one or more design solutions, a plurality of steps, wherein the plurality of steps. At step 404($i$), the one or more hardware processors 104 generate, by the solution synthesizer component 305, one or more control system solutions for the plurality of robotics environments, wherein the one or more control system solutions comprise an architectural design and a plurality of components for implementing the architectural design in the plurality of robotics environments. The solution synthesizer component 305 further generates one or more configurations corresponding to each of the plurality of robotics environments in which the one or more control system solutions are to be implemented and executed.

In an embodiment, the second set of information translated into the synthesized design or the one or more design solutions may initially be compiled by a code generator component (not shown in the figure) to generate, using the DSL 307, a set of implementation codes corresponding to a plurality of Robots Operating Systems (ROS), wherein each of the plurality of ROS correspond to at least one of the plurality of robotics environments. In an example implementation, the set of implementation codes may be generated in Python® as below:

manipulate_palm_request_script.py
    manipulate_palm_respone_script.py
    move_arm_request_script.py
    move_arm_response_script.py
    navigation_request_script.py
    navigation_response_script.py In an embodiment, the one or more hardware processors 104 then generate, using the DSL 307, one or more configuration files corresponding to a plurality of robotic simulators, wherein each of the plurality of robotic simulators correspond to at least one of the plurality of robotics environments. The one or more configuration files facilitate implementation of the one or more control system solutions in the plurality of robotics environments. For example, the one or more configuration files may specify what sensors, actuators, and API are being used on a particular robot. Use of a scripting structure together with the configuration enables easy reconfiguration of behaviors and functionality of the robot without having to modify source code (i.e., for example, recompile the C/C++ code). In an example implementation, the one or more configuration files may be generated for the warehouse procurement environment as below:

CLOSE_GRIPPER_PALM.srv
    OPEN_GRIPPER_PALM.srv

Figure 8:
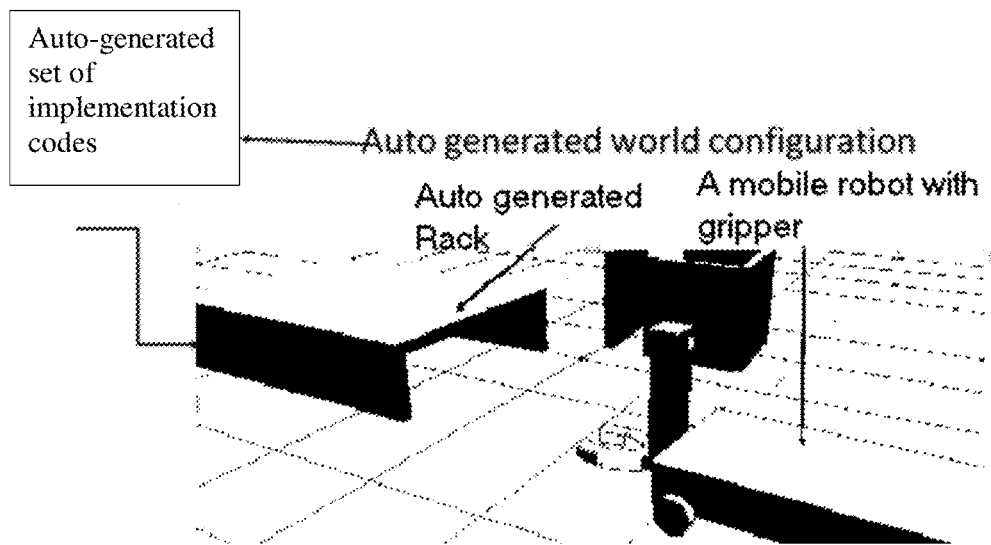
FIG. 8 illustrates one or more control system solutions generated for a plurality of robotics environment, in accordance with some embodiments of the present disclosure.

In an embodiment, the one or more hardware processors 104 finally generate the one or more control system solutions by implementing the set of implementation codes and the one or more configuration files. Referring to FIG. 8, the one or more control system solutions generated may be referred. Referring to FIG. 8 again, it may be noted that the one or more control system solutions comprise the set of implementation codes (shown below), the architectural design and the plurality of components, for example a gripper and an auto-generate rack, for implementing the architectural design in the plurality of robotics environments.

As mentioned above, the one or more control system solutions generated correspond to the middleware architecture depicted via FIG. 2. The one or more hardware processors 104 deploy the one or more control system solutions generated in each of the plurality of robotics environments via the auto-configuration and deployment component 308, and the operations component 309 ensures that the operational system behaves as expected and as specified in the initial design for implementing and executing the one or more control system solutions deployed in each of the plurality of robotics environments.

Auto-Generated Set of Implementation Codes in FIG. 8

```
<model name="simple_mobile_manipulatorn>
<include>
<uri>model://my_gripper</uri>
<pose>1.3 0 0.1 0 0 0</pose>
</include>
<include>
<uri>model://my_robot</uri>
<pose>0 0 0 0 0 0</pose>
</include>
<joint name="arm_gripper_joint" type="fixed">
<parent>mobile_base::chassis</parent>
<child>simple_gripper:riser</child>
</joint>
```

According to an embodiment of the present disclosure, at step 404(*ii*), the one or more hardware processors 104 generate, via the solution synthesizer component 305, one or more simulation models for executing a set of simulation activities (for example, a robot picking up an article in the warehouse procurement) in the simulating environment. The one or more simulation models generated may employ any simulation technique for executing the set of simulation activities. The simulation one or more models may also, or instead, employ statistical models, heuristic models, linear models, qualitative models, decision analysis models, decision trees and any other modeling or behavioral techniques useful for characterizing and predicting responses of a plurality of robots operating in the plurality of robotics environments.

In an example implementation of step 404(*ii*), for the warehouse procurement, configuration for generating the one or more simulation models (in the simulation environment) may be generated as below:

```
<sdf version='1.6'>
<world name='Warehouse-TCS-00001-Gurgaon'>
<light name='sun' type.'directional'>
 <cast_shadows>1</cast_shadows>
 <pose frame="">0 0 10 0 -0 0</pose>
 <diffuse>0.8 0.8 0.8 1</diffuse>
 <specular>0.1 0.1 0.1 1</specular>
 <attenuation>
  <range>1000</range>
  <constant>0.9</constant>
  <linear>0.01</linear>
  <quadratic>0.001</quadratic>
 </attenuation>
 <direction>-0.5 0.5 -1</direction>
</light>
<gravity>0 0 -9.8</gravity>
    <magnetic_field>6e-06 2.3e-05 -4.2e-05</magnetic_field>
    <atmosphere type.'adiabatic'/>
    <physics name='default_physics' default='0' type='ode'>
      <max_step_size>0.001</max_step_size>
```

-continued

```
      <real_time_factor>1</real_time_factor>
      <real_time_update_rate>1000</real_time_update_rate>
    </physics>
    <scene>
     <ambient>0.4 0.4 0.4 1</ambient>
     <background>0.7 0.7 0.7 1</background>
     <shadows>1</shadows>
    </scene>
    <spherical_coordinates>
     <surface_model>EARTH_WGS84</surface_model>
     <latitude_deg>0</latitude_deg>
     <longitude_deg>0</longitude_deg>
     <elevation>0</elevation>
     <heading_deg>0</heading_deg>
    </spherical_coordinates>
<model name='ground_plane'>
<include><uri>model://ground_plane</uri></include>
</model>
<model name='Bin-00001_0'>
    <include><uri>model://Bin-00001</uri></include>
    <pose frame = "">3.0 3.0 0.0 0 0 0</pose>
</model>
<model name='Rack-0001_0'>
    <include><uri>model://BaseRackModel</uri></include>
    <pose frame = "">0.0 0.0 0.0 0 0 0</pose>
</model>
<!-- <population name="can_population3">
    <model name="can3"> <!-- coke can height (z) is 0.003988*2, diameter is around 0.17
        <include>
            <static>false</static>
          <uri>model://coke_can</uri>
        </include>
        </model>
        <pose>-1.0 2.0 1.35 0 0 0.0</pose>
        <box>
         <size>1.5 1.0 0.5</size>
        </box>
        <model_count>20</model_count>
        <distribution>
         <type>uniform</type>
        </distribution>
       </population> -->
    <gui fullscreen='0'>
      <camera name='user_camera'>
       <pose frame="">5 -5 2 0 0.275643 2.35619</pose>
       <view_controller>orbit</view_controller>
       <projection_type>perspective</projection_type>
      </camera>
     </gui>
    <model name='simple_mobile_manipulator'>
    <include><uri>model://simple_mobile_manipulator</uri></include>
        <pose frame = "">5.0 0.0 0.0 0 0 3.09</pose>
    </model>
   </world>
  </sdf>
```

Further, the one or more simulation models for the warehouse procurement simulation environment may be generated (based upon the configuration generated) as below, wherein the one or more simulation models may be used to simulate a plurality of robots and operating control of the plurality of robots.

```xml
<?xml version="1.0" ?>
<sdf version="1.5">
<!--
  <world name="default">
    <!-- A global light source -->
    <include>
      <uri>model://sun</uri>
    </include>
    <!-- A ground plane -->
    <include>
      <uri>model://ground_plane</uri>
    </include>
-->
    <model name="simple_mobile_manipulator">
      <include>
        <uri>model://my_gripper</uri>
        <pose>1.3 0 0.1 0 0 0</pose>
      </include>
      <include>
        <uri>model://my_robot</uri>
        <pose>0 0 0 0 0 0</pose>
      </include>
      <joint name="arm_gripper_joint" type="fixed">
        <parent>mobile_base::chassis</parent>
        <child>simple_gripper:riser</child>
      </joint>
      <!-- attach sensor to the gripper -->
      <!--
      <include>
      <uri>model://hokuyo</uri>
      <pose>1.3 0 0.3 0 0 0</pose>
      </include>
      <joint name="hokuyo_joint" type="fixed">
      <child>hokuyo::link</child>
      <parent>simple_gripper:palm</parent>
      </joint>
      -->
      <plugin             name="simple_mobile_manipulator"
filename="libsimple_mobile_manipulator_plugin.so">
      </plugin>
    </model>
<!--
  </world>
-->
</sdf>
```

In an embodiment, the one or more hardware processors 104 generate one or more design specifications corresponding to the generated synthesized design, to verify the one or more control system solutions generated. The one or more hardware processors 104 validate the one or more control system solutions generated via the solution validation component 306. The one or more design specifications facilitate a simulation of an implementation of the one or more control system solutions by running the one or more simulation models. In an example implementation, referring to FIG. 8 yet again, the one or more design specifications generated may be referred, wherein set of implementation codes or ROS codes are executed to generate a simulating model for the warehouse procurement.

According to an embodiment of the present disclosure, the generated one or more control system solutions may be optimized, based upon the one or more simulation models, to extract a behavior model by using the solution synthesizer component 305. The simulation facilitates an optimization and a performance tuning of a plurality of parameters (for example, time, cost and latency) corresponding to the plurality of robotic environments. In an embodiment, the solution synthesizer component 305 may use one or more third party frameworks or applications, for example Gazebo® simulator, to perform the simulations.

In an embodiment, the optimization comprises performing a close loop verification by executing, based upon the generated one or more control system solutions, a set of task execution logs to validate a plurality of commands, a plurality of state transitions executing, time of triggering each of the plurality of commands, and time of termination of each of the plurality of commands in the plurality of robotics environments. The optimization and the performance tuning may be explained in detail considering an example scenario.

Considering an example scenario, suppose the generated one or more control system solutions is implemented for the warehouse procurement, wherein the simulation is performed, for example, using the Gazebo® simulator. Any executing control system solution amongst the generated one or more control system solutions, when executing in the simulated environment may log an operational information comprising the set of task execution logs as below:

[INFO] [1420702977.006703278]: Capability:Mobile_Chasis.Navigation 11:23:04'

Referring to the set of task execution logs above, it may be noted that the one or more control system solutions when implemented or executed in the plurality of robotics environments trigger a capability 'Navigation' at time 11:23:04. Further, any other information (comprising any complex information corresponding to the plurality of robotics environments) like command parameters, latency in executing command(s) etc. may also be generated from the set of task execution logs. The set of task execution logs may thus be generated from the one or more control system solutions implemented or executed in the plurality of robotics environments.

In an embodiment, the set of task execution logs facilitate extracting the behavior model for a robotics system corresponding to the plurality of robotics environments. The behavior model comprises details corresponding to the plurality of commands, the time of triggering each of the plurality of commands, the time of terminating each of the plurality of commands, the plurality of state transitions triggered from each of the plurality of commands, and a corresponding set of events arising from the plurality of commands etc.

Figure 9:
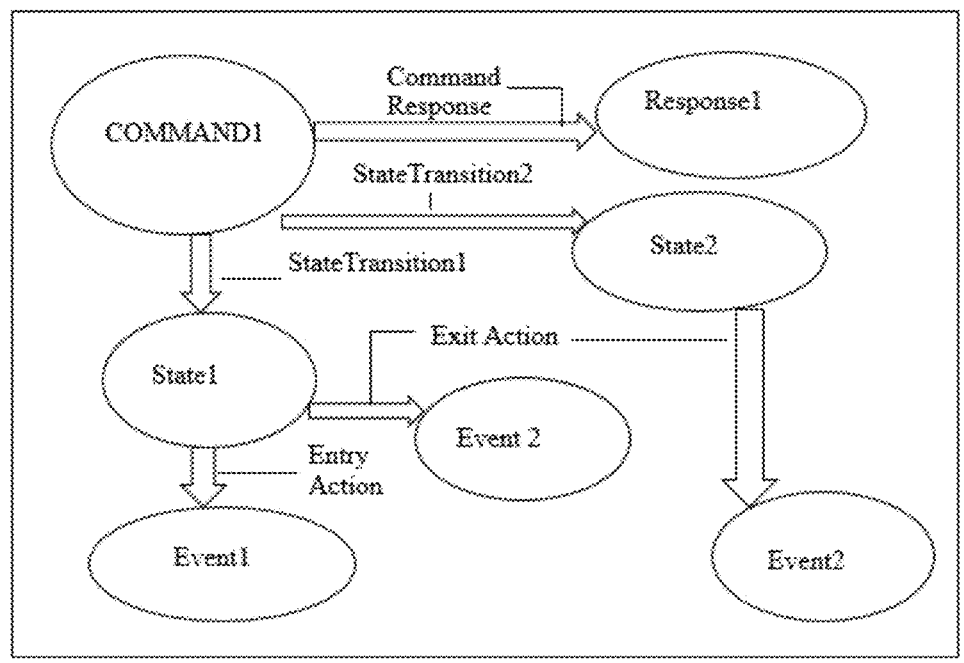
FIG. 9 illustrates an example of a behavior model extracted for a single robotic component to facilitate an optimization of the one or more control system solutions generated, in accordance with some embodiments of the present disclosure.
Figure 10:
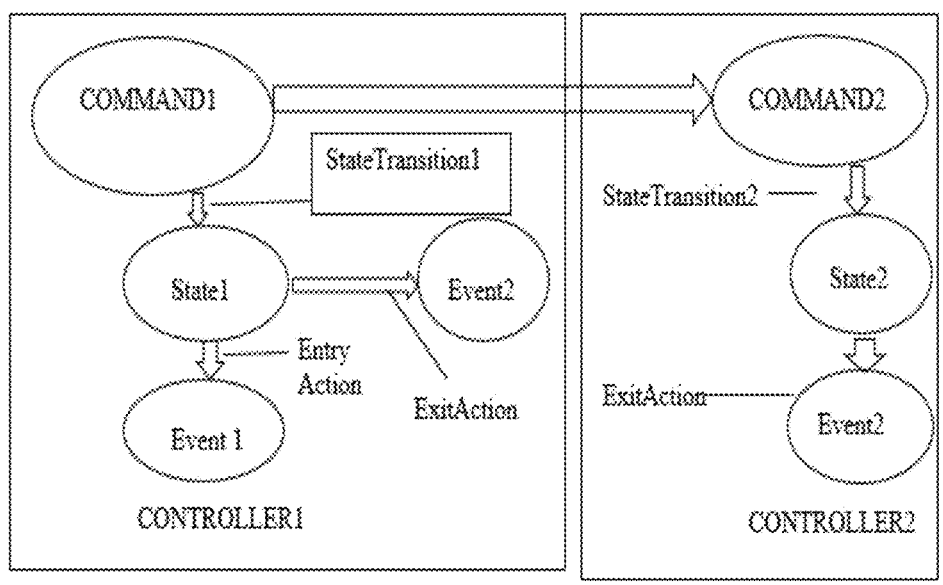
FIG. 10 illustrates an example of another behavior model extracted for a robotic operation across one or more component controller to facilitate the optimization of the one or more control system solutions generated, in accordance with some embodiments of the present disclosure.

In an example implementation, referring to FIGS. 9 and 10, examples of the behavior model comprising the plurality of commands, the time of triggering each of the plurality of commands, the time of terminating each of the plurality of commands, the plurality of state transitions triggered from each of the plurality of commands may be referred. Referring to FIG. 9 an example of the behavior model extracted for operating a single robotic component (for example a robotic arm) may be referred, wherein the one or more control system solutions generated execute within a robotic component. Referring to FIG. 10 another example of the behavior model extracted for one or more robotic operations across one or more component controllers may be referred, wherein the one or more control system solutions generated execute across a plurality of robotic components (for example, one or more robotic arms and one or more robotic wheels).

In an embodiment, the behavior model may further be verified against an initial activity flow to verify if the one or more control system solutions executed as corresponding to an initial activity flow. The process is called as a closed loop verification. Thus, the optimization facilitates the close loop verification by executing, based upon the behavior model, a set of task execution logs to validate the plurality of commands and the plurality of state transitions executing in the plurality of robotics environments.

In an embodiment, the set of task execution logs may further be used to identify one or more executing commands amongst the plurality of commands and one or more state transitions amongst the plurality of state transitions taking more time to execute. Based upon the identification, appropriate changes may be implemented in the one or more executing commands and/or the one or more state transitions or any other problematic modules, by modifying the corresponding algorithms for a better performance or optimization or by using a different software library. This results in the optimization or the performance tuning of a time factor based upon the set of task execution logs. Similarly, the optimization or the performance tuning may be performed for other factors, for example, cost, latency etc.

According to an embodiment of the present disclosure, the technical advantages of the proposed disclosure may now be considered in detail. As discussed above, referring to FIG. 2 again, it may be noted that the proposed disclosure provides for the generic middleware architecture which may be used create robotic solutions for the plurality of robotic domains comprising the plurality of problems for which one or more robotic solutions may be desired. The middleware architecture may serve as the standard architecture for a plurality of robotic solutions to be created.

The proposed disclosure proposes a knowledge centric engineering platform that significantly reduces the complexity involved in the creation of any robotic software. Further, the proposed disclosure provides for a significant robotics software reuse and allows the same codebase to be reused or recreated for a family of related (e.g. warehouse) applications to be reused by configuring it appropriately with minimal changes.

The one or more control system solutions may be auto-generated to be implemented for the plurality of robotics environments. For example, the one or more control system solutions may be implemented for a plurality of robots operating in a farm to perform a plurality of activities (for example, picking up seeds). Thus, the solution proposed by the proposed disclosure is completely configurable, and can be adapted both statically and dynamically. The proposed methodology thus provides numerous advantages, particularly in autonomous robotics applications and in applications where numerous individual and independent units are integrated into an overall functional group, such as might be desirable or necessary when implementing a robot solution.

The proposed disclosure also enables automatic assembly and development of robotics and automation applications, and provides the ability to automatically manage the cycle of one or more applications in a robotics or automation environment. The ability to plug in a wide variety of third-party frameworks (e.g., Gazebo®) provides an advantage not available from current technologies in the robotics and automation fields. Finally, as discussed above, the proposed disclosure provides for the optimization and the closed loop verification of the one or more control system solutions generated, and generating the one or more design specifications for performing the simulation the one or more control system solutions by running the one or more simulation models.

In an embodiment, the memory 102 can be configured to store any data that is associated with generating the one or more control system solutions for the plurality of robotics environments. In an embodiment, the information pertaining to the first set of information acquired, the second set of information extracted, the one or more design solutions, the synthesized design, and the one or more control system solutions generated etc. is stored in the memory 102. Further, all information (inputs, outputs and so on) pertaining to generating the one or more control system solutions for the plurality of robotics environments may also be stored in the database, as history data, for reference purpose.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of generating (or auto-generating) the one or more control system solutions for the plurality of robotics environments (comprising both the real-time and the simulating environment). The embodiment, thus provides acquiring of the robotics domain knowledge corresponding to the plurality of robotics environments, extracting the one or more solution specifications based upon the robotics domain knowledge, generating the one or more design solutions and the synthesized design, and finally generating the one or more control system solutions for the plurality of robotics environments based upon the one or more design solutions. Moreover, the embodiments herein further provides for generating, using the DSL 307, the set of implementation codes, and the optimization of the one or more control system solutions generated by implementing the closed loop verification.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating control system solutions for robotics environments, the method comprising a processor implemented steps of:
   acquiring, via one or more hardware processors, a first set of information from a plurality of sources, wherein the first set of information comprises knowledge from a plurality of robotic domains corresponding to a plurality of robotics environments, resources and capabilities corresponding to the plurality of robotic domains, a description of a plurality of processes and tasks that one or more robot performs, a set of workflow definitions to carry out the plurality of tasks based upon a task, a set of instructions that the one or more robot performs to carry out the plurality of tasks and information on a plurality of contextual problems, and wherein the plurality of robotics environments comprise a real-time environment and a simulating environment;
   extracting, based upon the first set of information, a second set of information via a solution description component, wherein the second set of information comprises one or more solution specifications corresponding to the plurality of robotics environments, wherein the one or more solution specifications comprises description of one or more solutions in one or more languages and wherein each language of the one or more languages integrate corresponding vocabularies to its own language of the one or more languages, a plurality of concepts and relationships corresponding to the first set of information;
   translating, via a solution synthesizer component, the second set of information using a solution description language into one or more design solutions for the plurality of robotics environments, wherein the one or more design solutions represent one or more designs for a robotic application; and
   performing, based upon the one or more design solutions, a plurality of steps, wherein the plurality of steps comprise:
   (i) generating, via the solution synthesizer component, one or more control system solutions for the plurality of robotics environments, wherein the one or more control system solutions comprise a set of implementation codes, an architectural design and a plurality of components for implementing the architectural design in the plurality of robotics environments, wherein the step of generating the one or more control system solutions comprises
   (ii) generating, using a Domain Specific Language (DSL), the set of implementation codes corresponding to a plurality of Robots Operating Systems (ROS), upon compilation of the one or more design solutions by a code generator component, wherein each of the plurality of ROS correspond to at least one of the plurality of robotic environments; and
   (iii) generating, using the DSL, one or more configuration files corresponding to a plurality of robotic simulators, wherein each of the plurality of robotic simulators correspond to at least one of the plurality of robotic environments, wherein the one or more configuration files facilitate implementation of one or more control system solutions in the plurality of robotic environments and the one or more configuration files specify the kind of sensors, actuators, and Application programming interface (API) to be used on a particular robot; and
   (iv) generating, via the solution synthesizer component, one or more simulation models for executing a set of simulation activities in the simulating environment, wherein the simulation activities facilitate optimization and performance tuning of a plurality of parameters, it of parameters being at least one of time, cost and latency.

2. The method of claim 1, wherein the step of translating the second set of information comprises generating, based upon the first set of information, a synthesized design for the one or more control system solutions by the solution synthesizer component.

3. The method of claim 2, wherein the synthesized design represents a synthesized solution for a set of multi-robots activities and tasks to be executed in each of the plurality of robotics environments.

4. The method of claim 1, wherein the generated one or more control system solutions are optimized, based upon the one or more simulation models, to extract a behavior model by the solution synthesizer component, and wherein the behavior model comprises a plurality of commands and a plurality of state transitions executing in the plurality of robotics environments.

5. The method of claim 4, wherein the optimization comprises performing a close loop verification by executing, based upon the behavior model, a set of task execution logs to validate the plurality of commands and the plurality of state transitions executing in the plurality of robotics environments.

6. A system for generating control system solutions for robotics environments, the system comprising:
a memory storing instructions;
one or more communication interfaces; and
one or more hardware processors coupled to the memory via the one or more communication interfaces, wherein the one or more hardware processors are configured by the instructions to:
acquire, a first set of information from a plurality of sources, wherein the first set of information comprises knowledge from a plurality of robotics domains corresponding to a plurality of robotics environments, information on resources and capabilities corresponding to the plurality of robotics domains, a description of a plurality of processes and tasks that one or more robots performs, a set of workflow definitions to carry out the plurality of tasks based upon a task, a set of instructions that the one or more robots performs to carry out the plurality of tasks and information on a plurality of contextual problems and wherein the plurality of robotics environments comprise a real-time environment and a simulating environment;
extract, based upon the first set of information, a second set of information via a solution description component, wherein the second set of information comprises one or more solution specifications corresponding to the plurality of robotics environments, wherein the one or more solutions specifications comprises description of one or more solutions in one or more languages, and wherein each language of the one or more languages integrate corresponding vocabularies to its own language of the one or more languages, a plurality of concepts and relationships corresponding to the first set of information;
translate, via a solution synthesizer component, the second set of information using a solution description language into one or more design solutions for the plurality of robotics environments, wherein the one or more design solutions represent one or more designs for a robotic application comprising a robotic software; and
perform, based upon the one or more design solutions, a plurality of steps, wherein the plurality of steps comprise:
(i) generate, via the solution synthesizer component, one or more control system solutions for the plurality of robotics environments, wherein the one or more control system solutions comprise a set of implementation codes, an architectural design and a plurality of components for implementing the architectural design in the plurality of robotics environments, wherein the step of generating the one or more control system solutions comprises:
(i) generate, using a Domain Specific Language (DSL), the set of implementation codes corresponding to a plurality of Robots Operating Systems (ROS), upon compilation of the one or more design solutions by a code generator component, wherein each of the plurality of ROS correspond to at least one of the plurality of robotic environments;
(ii) generate, using the DSL, one or more configuration files corresponding to a plurality of robotic simulators, wherein each of the plurality of robotic simulators correspond to at least one of the plurality of robotic environments, wherein the one or more configuration files facilitate implementation of one or more control system solutions in the plurality of robotic environments and the one or more configuration files specify the kind of sensors, actuators, and Application programming interface (API) to be used on a particular robot; and
(ii) generate, via the solution synthesizer component, one or more simulation models for executing a set of simulation activities in the simulating environment, wherein the simulation activities facilitate optimization and performance tuning of a plurality of parameters, the plurality of parameters being at least one of time, cost and latency.

7. The system of claim 6, wherein the one or more hardware processors are configured to translate the second set of information by generating, based upon the first set of information, a synthesized design for the one or more control system solutions via the solution synthesizer component.

8. The system of claim 7, wherein the synthesized design represents a synthesized solution for a set of multi-robots activities and tasks to be executed in each of the plurality of robotics environments.

9. The system of claim 6, wherein the one or more hardware processors are configured to optimize, based upon the one or more simulation models, the generated one or more control system solutions to extract a behavior model via the solution synthesizer component, and wherein the behavior model comprises a plurality of commands and a plurality of state transitions executing in the plurality of robotics environments.

10. The system of claim 9, wherein the optimization comprises performing a close loop verification by executing, based upon the behavior model, a set of task execution logs to validate the plurality of commands and the plurality of state transitions executing in the plurality of robotics environments.

11. One or more non-transitory machine readable information storage mediums comprising one or more instructions which when executed by one or more hardware processors causes the one or more hardware processor to perform a method generating control system solutions for robotics environments, said method comprising:
acquiring, via the one or more hardware processors, a first set of information from a plurality of sources, wherein the first set of information comprises knowledge from a plurality of robotics domains corresponding to a plurality of robotics environments, information on resources and capabilities corresponding to the plurality of robotics domains, a description of a plurality of processes and tasks that one or more robots performs, a set of workflow definitions to carry out the plurality of tasks based upon a task, a set of instructions that the one or more robots performs to carry out the plurality of tasks and information on a plurality of contextual problems, and wherein the plurality of robotics environments comprise a real-time environment and a simulating environment;
extracting, based upon the first set of information, a second set of information via a solution description component, wherein the second set of information comprises one or more solution specifications corresponding to the plurality of robotics environments, wherein the one or more solution specifications comprises description of one or more solutions in one or more languages and wherein each language of the one or more languages integrate corresponding vocabularies to its own language of the one or more languages, a plurality of concepts and relationships corresponding to the first set of information;

translating, via a solution synthesizer component, the second set of information using a solution description language into one or more design solutions for the plurality of robotics environments, wherein the one or more design solutions represent one or more designs for a robotic application comprising a robotic software; and performing, based upon the one or more design solutions, a plurality of steps, wherein the plurality of steps comprise:
  (i) generating, via the solution synthesizer component, one or more control system solutions for the plurality of robotics environments, wherein the one or more control system solutions comprise a set of implementation codes, an architectural design and a plurality of components for implementing the architectural design in the plurality of robotics environments, wherein the step of generating the one or more control system solutions comprises:
  (ii) generating, using a Domain Specific Language (DSL), the set of implementation codes corresponding to a plurality of Robots Operating Systems (ROS), upon compilation of the one or more design solutions by a code generator component, wherein each of the plurality of ROS correspond to at least one of the plurality of robotic environments; and
  (iii) generating, using the DSL, one or more configuration files corresponding to a plurality of robotic simulators, wherein each of the plurality of robotic simulators correspond to at least one of the plurality of robotic environments, wherein the one or more configuration files facilitate implementation of one or more control system solutions in the plurality of robotic environments and the one or more configuration files specify the kind of sensors, actuators, and Application programming interface (API) to be used on a particular robot; and
  (iv) generating, via the solution synthesizer component, one or more simulation models for executing a set of simulation activities in the simulating environment, wherein the simulation activities facilitates optimization and performance tuning of a plurality of parameters, it of parameters being at least one of time, cost and latency.

12. The one or more non-transitory machine readable information storage mediums of 11, wherein the step of translating the second set of information comprises generating, based upon the first set of information, a synthesized design for the one or more control system solutions by the solution synthesizer component.

13. The one or more non-transitory machine readable information storage mediums of 12, wherein the synthesized design represents a synthesized solution for a set of multi-robots activities and tasks to be executed in each of the plurality of robotics environments.

14. The one or more non-transitory machine readable information storage mediums of 11, wherein the generated one or more control system solutions are optimized, based upon the one or more simulation models, to extract a behavior model by the solution synthesizer component, and wherein the behavior model comprises a plurality of commands and a plurality of state transitions executing in the plurality of robotics environments.

15. The one or more non-transitory machine readable information storage mediums of 14, wherein the optimization comprises performing a close loop verification by executing, based upon the behavior model, a set of task execution logs to validate the plurality of commands and the plurality of state transitions executing in the plurality of robotics environments.

* * * * *